United States Patent [19]

Watt et al.

[11] Patent Number: 5,722,624
[45] Date of Patent: Mar. 3, 1998

[54] LAPTOP COMPUTER SUPPORT

[75] Inventors: Richard L. Watt; Keith R. Ptak, both of Jamestown, N.Y.

[73] Assignee: Weber Knapp Company, Jamestown, N.Y.

[21] Appl. No.: 654,620

[22] Filed: May 29, 1996

[51] Int. Cl.[6] .................................... A47B 96/06
[52] U.S. Cl. ................... 248/205.1; 248/242; 248/291
[58] Field of Search ................. 248/205.1, 242, 248/291.1, 292.14, 294.1, 918, 923, 922, 921

[56] References Cited

U.S. PATENT DOCUMENTS

| 2,558,323 | 6/1951 | Strun | 155/82 |
|---|---|---|---|
| 3,151,576 | 10/1964 | Patterson | 248/242 |
| 3,662,982 | 5/1972 | Antonius | 248/205.1 |
| 3,991,961 | 11/1976 | Platzer, Jr. | 248/99 |
| 4,562,987 | 1/1986 | Leeds et al. | 248/278 |
| 4,776,284 | 10/1988 | McIntosh | 108/138 |
| 4,826,123 | 5/1989 | Hannah et al. | 248/248 |
| 4,913,390 | 4/1990 | Berke | 248/176 |
| 4,976,407 | 12/1990 | Schwartz et al. | 248/118.3 |
| 5,119,742 | 6/1992 | Simmie | 108/152 |
| 5,211,367 | 5/1993 | Musculus | 248/279 |
| 5,340,076 | 8/1994 | Dockwiller, III | 248/371 |
| 5,351,897 | 10/1994 | Martin | 244/118 |
| 5,402,972 | 4/1995 | Schmidt | 248/118 |
| 5,405,204 | 4/1995 | Ambrose | 400/472 |

FOREIGN PATENT DOCUMENTS 265331  2/1927  United Kingdom ............... 248/242

*Primary Examiner*—Ramon O. Ramirez
*Assistant Examiner*—Kimberly Wood
*Attorney, Agent, or Firm*—Bean, Kauffman & Snyder

[57] ABSTRACT

An adjustable support is provided for removably supporting a laptop computer relative to a table top for relative vertical and tilting movements. The computer is clampingly secured to a platform, which is in turn supported for vertical tilting movement relative to a bracket. The bracket is supported for vertical adjustment relative to a midportion of a pair of support arms having their free ends arrayed to engage with upwardly and downwardly facing surfaces of the table top.

4 Claims, 2 Drawing Sheets

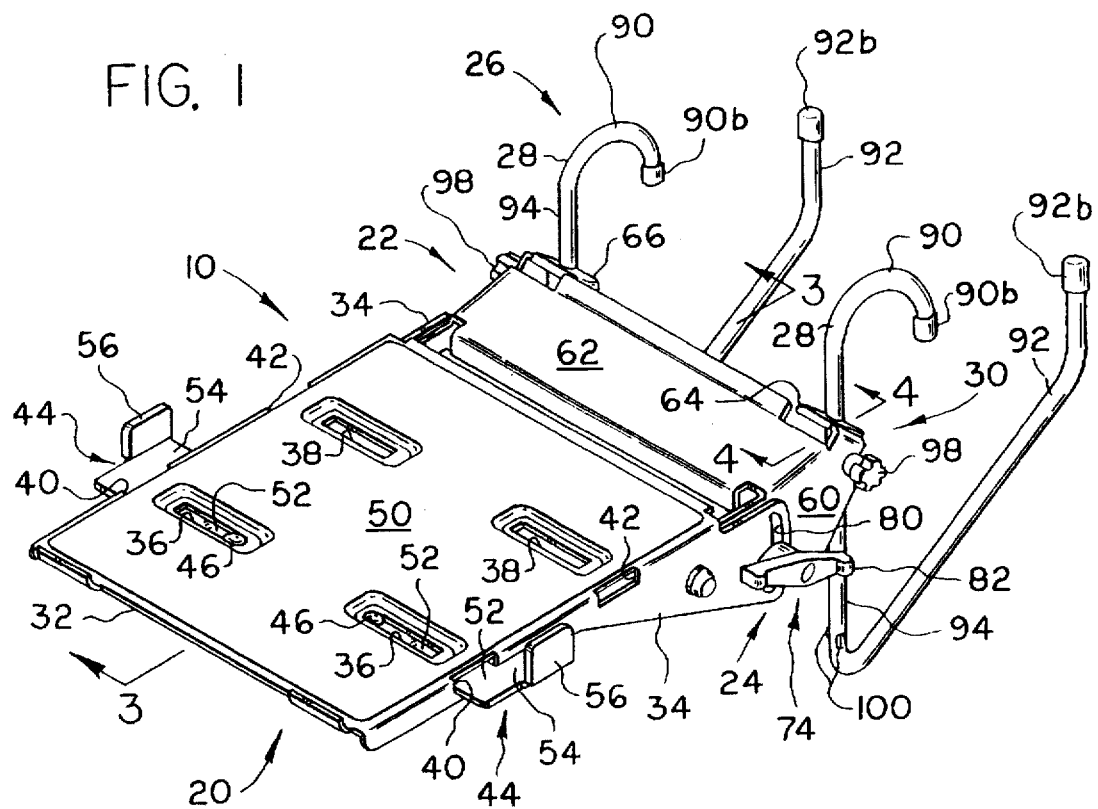
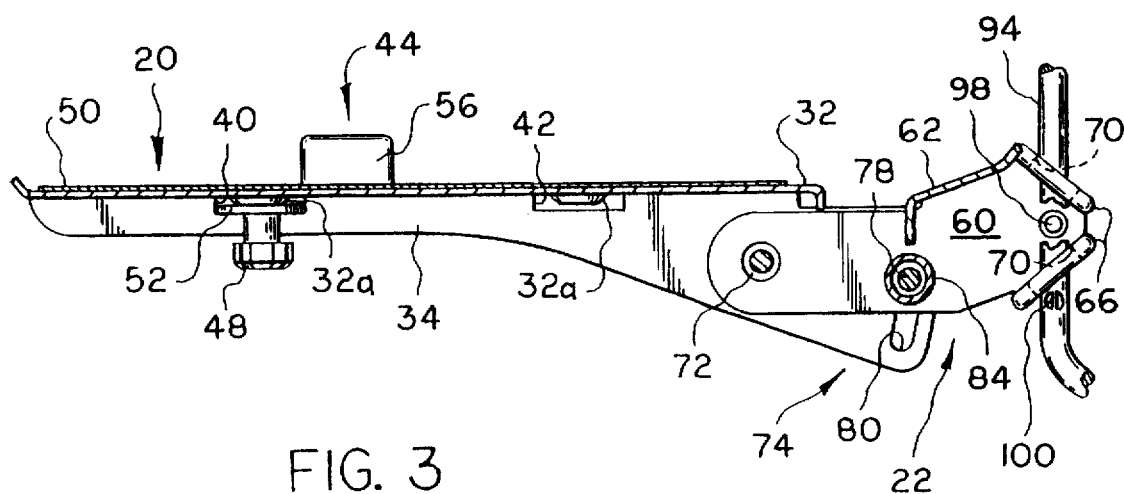

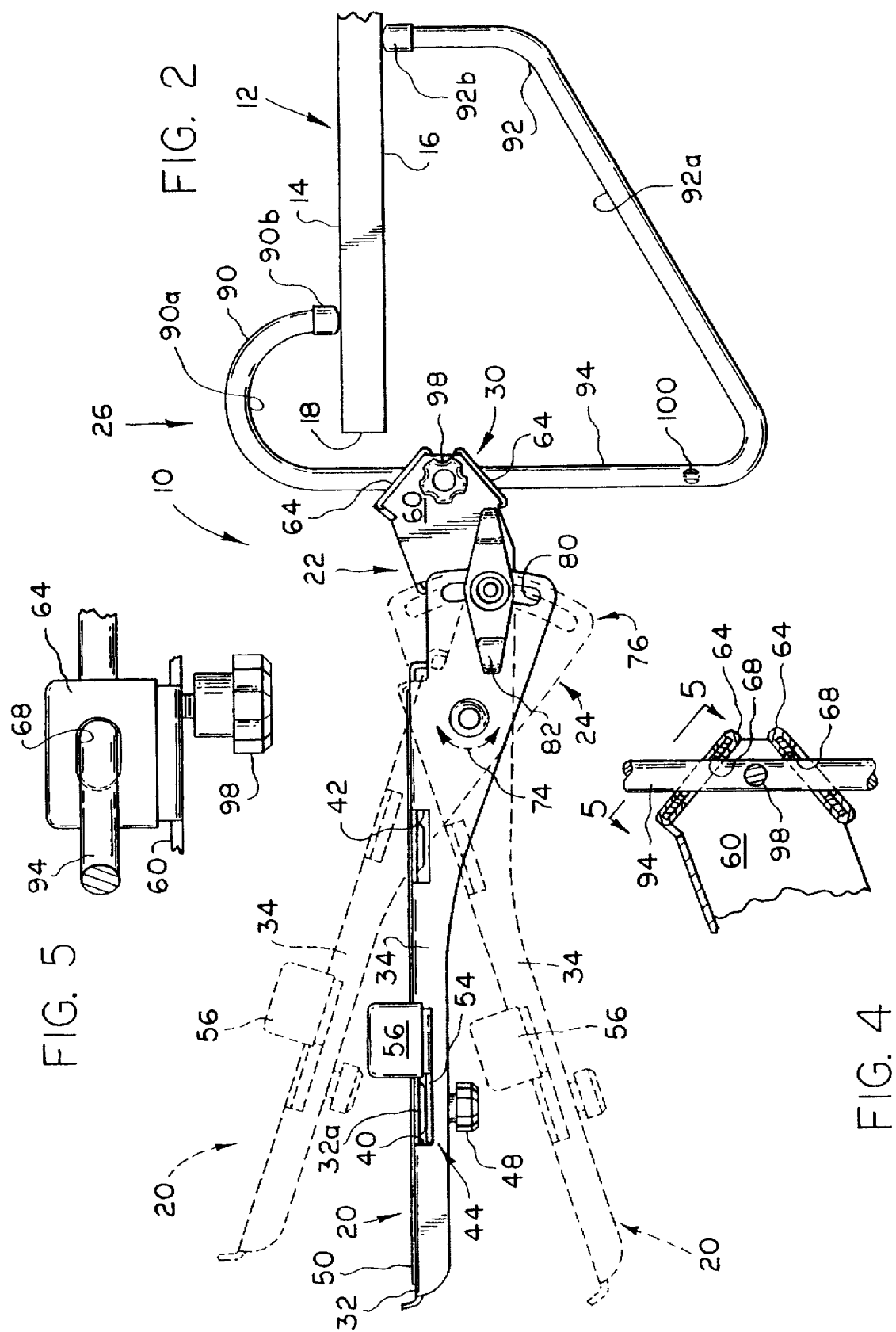

5,722,624

LAPTOP COMPUTER SUPPORT

BACKGROUND OF THE INVENTION

It has been proposed to mount an art device supporting platform or surface defining member relative to a table top or the like by arm like clamping members, which are adjustably fixed relative to the platform and have first and second end portions arranged for removable engagement with upper and lower surfaces of the table top, as evidenced by U.S. Pat. Nos. 2,558,323 and 5,119,742.

SUMMARY OF THE INVENTION

The present invention is directed towards an adjustable support for removably and adjustably mounting an art device, such as a laptop computer, relative to a table top or the like.

The present invention provides an adjustable support, wherein a computer is adapted to be removably, clampingly secured to platform, which is supported for vertical tilting movement relative to a bracket. The bracket is in turn supported for vertical adjustment relative to a midportion of a pair of integrally formed support arms having their free or opposite ends arranged to engage with upwardly and downwardly facing surfaces of the table top.

BRIEF DESCRIPTION OF THE DRAWINGS

The nature and mode of operation of the present invention will now be more fully described in the following detailed description taken with the accompanying drawings wherein:

FIG. 1 is a perspective view of an adjustable support for an art device, such as a portable laptop computer, incorporating the present invention;

FIG. 2 is a side elevational view of the adjustable support as viewed from the right in FIG. 1 with broken line showing positive and negative tilt positions thereof;

FIG. 3 is a sectional view taken generally along the line 3—3 in FIG. 1;

FIG. 4 is a sectional view taken generally along the line 4—4 in FIG. 1; and

FIG. 5 is a sectional view taken generally along the line 5—5 in FIG. 4.

DETAILED DESCRIPTION

The adjustable support of the present invention, which is generally designated as 10 in FIGS. 1 and 2, is intended for mounting a suitable art device, such as a portable laptop computer, not shown, in a user selected adjusted position relative to a suitable support, such as a table top 12 shown only in FIG. 2 as having an upwardly facing surface 14, a downwardly facing surface 16, and an edge surface 18 extending vertically between surfaces 14 and 16.

Adjustable support 10 generally comprises a platform means 20 for removably mounting a laptop computer; bracket means 22; tilt adjustment means 24 for adjustably mounting the platform means for vertical tilting movements relative to the bracket means; support arm means 26 preferably including a pair of support arms 28 and 28; and attachment means 30 for adjustably attaching the bracket means to the support arms.

Platform means 20 is shown in the drawings as being inverted U-shaped construction defined by an expansive mounting portion 32 sized to underengage with a laptop computer and a first pair of parallel flanges 34,34 depending from opposite side edges of the mounting portion.

Preferably, suitable clamping means are provided to releasably clamp the laptop computer to platform means 20. Such clamping means may be defined by providing mounting portion 32 with pairs of elongated through slot openings 36,36 and 38,38; first pair of flanges 34,34 with pairs of through slot openings 40,40 and 42,42 arranged in alignment with slot openings 36,36 and 38,38 respectively, in a direction extending transversely of the mounting portion; a pair of clamping plates 44,44 having through openings, not shown; a pair of threaded clamping screws 46,46 shown only in FIG. 1 and sized for slidable receipt within the pairs of slot openings and the through openings of the clamping plates; and a pair of clamping knobs 48,48 for threadably receiving the clamping screws and cooperating therewith for adjustably and releasably clamping the clamping plates against the bottom surface of the mounting portion, as shown in FIG. 3. Preferably, that portion of the bottom surface of mounting portion 32 engaged by clamping plates 44,44 is defined by forming the mounting portion with plural embossments 32a, which peripherally bound each of slot openings 36,36 and 38,38. Also, it is preferable to provide the upper surface of mounting portion with a sheet 50 of resiliently deformable material, which serves both to cushion the laptop computer and retard sliding movement thereof relative to the mounting portion.

Clamping plates 44,44 are preferably defined by L-shaped slide plate portions having a first leg portions 52,52 sized to be removably and slidably inserted through slot openings 40,40, 42,42 for clamping engagement with embossments 32a and second leg portions 54,54 from which upstand clamping plate portions 56,56 arranged for clamping engagement with opposite sides of the laptop computer. As desired, the clamping plate portions may be coated with resilient plastic material to prevent damage to the laptop computer.

As will be apparent, the distance between the pair of clamping portions 56,56 may be varied by loosening knobs 48,48 as required to permit sliding movements of first leg portions lengthwise of slots 36,36, whereafter the knobs are tightened to releasably retain the clamping portions in desired adjusted position. By completely unthreading screws 46,46 relative to knobs 48,48, clamping plates 44,44 may be removed from association with slots 36,36, inserted through slots 42,42 for operative association with slots 38,38 and adjustably fixed relative thereto by again threadably coupling screws 46,46 and knobs 48,48.

Also, due to the L-shaped configuration of clamping plates 44,44, the positions of clamping plates may be reversed relative to their associated slots 36,36 or 38,38 such that their second leg portions 54 extend forwardly of slot openings 40,40 or 42,42, as opposed to rearwardly thereof as shown in FIGS. 1 and 2.

Bracket means 22 is shown in the drawings as being of generally U-shaped construction defined by a second pair of parallel flanges 60,60 joined to opposite ends of a bridging portion 62, and two pairs of guide flanges 64,64 and 66,66 connected one pair to each of flanges 60,60. Guide flanges 64,64 and 66,66 are vertically inclined relative to one another as best shown in FIGS. 2–4 and formed with vertically aligned, elongated through guide openings 68,68 and 70,70 shown in FIGS. 3 and 4. As desired, the guide flanges may be coated with resiliently deformable material.

Tilt adjustment means 24 in generally shown in FIGS. 1–3 as including a bearing rod 72 whose opposite ends extend through aligned pairs of bore openings, not shown, formed in first pair of flanges 34,34 and second pair of flanges 60,60 for supporting means 20 for vertical swinging or tilting movement relative to bracket means 22, as indicated by arrow 74 in FIG. 2; and tilt adjust control locking means 76. Tilt control means 76 includes an elongated tension rod 78 whose opposite ends extend outwardly through a pair of aligned bore openings, not shown, formed in second pair of flanges 60,60 for sliding receipt within a pair of aligned, arculate slots 80,80 formed in first pair of flanges 34,34.

Tension rod 78 has a first end, not shown, which is enlarged to prevent movement thereof inwardly through its associated one of slots 80,80 and a second end, also not shown, which is threaded for receipt within a threaded opening, again not shown, provided in manually operated clamping knob 82. Tension rod 78 is surrounded by a compression tube 84 whose opposite ends are arranged for abutting engagement with inner or facing surfaces of second pair of flanges 60,60. As will be apparent, loosening of knob 82 allows tilting movement of platform means 20 relative to bracket means 22, as indicated by broken line in FIG. 2, between limits defined by engagement of the ends of rod 78 with the upper and lower ends of arculate slots 80,80, whereas subsequent tightening of the knob serves to releasably lock or retain the platform means in a desired tilted position.

Support arms 28 and 28 are best shown in FIG. 1 as having first end portions 90,90, which are arranged for engagement with table top upwardly facing surface 14; second end portions 92,92, which are arranged for engagement with table top downwardly facing surface 16; and connecting portions 94,94, which are formed integrally with and arranged to extend generally vertically between the end portions forwardly of table top edge surface 18. As best shown in FIG. 2, the first and second end portions are shaped to provide facing, concave surfaces 90a and 92a to provide ample clearance relative to table top 12, as the support arms are required to be tilted relative thereto to accommodate for varying spacings between surfaces 14 and 16. Preferably, the free ends of end portions 90,90 and 92,92 are enclosed by resiliently deformable caps 90b,90b and 92b,92b; and end portions 90,90 are smoothly curved to facilitate threading insertion thereof upwardly through guide openings 68,68 and 70,70 for positioning connecting portions within such guide openings prior to the mounting of caps 90b,90b.

Attachment means 30 includes previously described guide openings 68,68 and 70,70, which service to mount bracket means 22 for sliding movement vertically lengthwise of support arm connecting portions 94,94; and a pair of enlarged headed clamping screws 98,98, which are adjustably, threadably supported by second pair of flanges 60,60 to releasably, clampingly engage connecting portions 94,94 vertically intermediate the pairs of guide flanges 64,64 and 66,66.

Preferably, guide openings 68,68 and 70,70 are elongated in the direction in which guide flanges 64,64 and 66,66 are inclined relative to one another. The minimum or transverse dimension of the guide slots is such as to slidably receive support arms first end portions 90,90 and connecting portions 94,94, whereas the maximum or lengthwise dimension of the guide slots is such as to loosely receive the first end portions as same are threaded therethrough and then slidably receive the connecting portions.

The lowermost position of bracket means 22 relative to connecting portions 94,94 is preferably defined by deforming the lower ends of the connecting portions to provide transverse enlargements 100 sized to prevent movement thereof vertically through the lowermost ones of guide openings 68 and 70.

In operation, an initial height adjustment is made before placing the computer on mounting portion 22 by first loosening clamping screws 98,98. The height of one or the other of support arms 28,28 is then adjusted relative to bracket means 22 and the adjusted support arm then clamped in a desired adjusted position by tightening its associated clamping screw. The clamped support arm is then arranged to engage with table top 12, and the second support arm is then arranged so as to support the bracket means in level condition and subsequently clamped in adjusted position by tightening its associated clamping screw. A computer is then clamped in position on mounting portion 32 by adjustments of clamping plates 44,44 and subsequent tightening of clamping knobs 48,48. Finally, the degree of tilt of mounting portion 32 relative to bracket means 22 is adjusted by loosening clamping knob 82, tilting the mounting portion 32 about the axis of bearing rod 72 and again tightening the clamping knobs.

In the illustrated construction, mounting portion 32 may be adjusted to at least 10° downward and 15° upward tilt when support 10 is mounted on a table top having a thickness varying between about 0.25 and 1.50 inches. The degree of upward and downwardly tilt varies with thickness of the table top.

What is claimed is:

1. An adjustable support for removably mounting an art device relative to a support having upwardly and downwardly facing surfaces joined by an edge surface, said adjustable support comprising:

platform means for mounting said art device;

a bracket;

tilt adjustment means for mounting said platform means on said bracket for adjustable vertical tilting movement relative thereto;

support arm means having a first end portion arranged for engagement with said upwardly facing surface, a second end portion arranged for engagement with said downwardly facing surface and a connecting portion arranged to extend vertically between said end portions forwardly of said edge surface, said support arm means includes a pair of arms; and attachment means for adjustably attaching said bracket to said connecting portion of said support arm means for adjusting the height of said bracket relative to said support when said upwardly and downwardly facing surfaces thereof are engaged by said first and second end portions, respectively, said attachment means includes a pair of guide means slidably supporting said bracket for movement lengthwise of said connecting portion of each of said arms and a pair of clamping means for releasably clamping said bracket relative to said connecting portion of each of said arms in adjusted position lengthwise thereof, each of said pair of guide means includes a pair of guide flanges carried by said bracket with said guide flanges being formed with aligned through openings for slidably receiving said arms, and each of said pair of said clamping means includes a clamping screw adjustably threadably supported by said bracket for clampingly engaging said connecting portion intermediate said pair of guide flanges, said guide flange of each pair of said guide flanges are vertically inclined relative to one another and said through openings are elongated with a minimum dimension sized to slidably engage said connecting portion and a maximum dimension sized to permit one of said first end portion and said second end portion to be removably inserted therethrough for positioning said connecting portion within said through openings, and said maximum dimension extends in the direction in which said guide flanges of each pair are inclined relative to one another.

2. An adjustable support for removably mounting an art device relative to a support having upwardly and downwardly facing surfaces joined by an edge surface, said adjustable support comprising:

platform means having a mounting portion for mounting said art device thereon and a first pair of flanges depending from said mounting portion;

a bracket having a second pair of flanges, a bridging flange connected to each of said second pair of flanges adjacent opposite ends thereof, and two pairs of guide flanges each pair of guide flanges being connected to each of said second pair of flanges, said guide flanges of each said pair of said guide flanges having aligned through openings;

tilt adjustment means operably connecting said first and second pairs of flanges for mounting said platform means on said bracket to permit adjustable tilting movement of said mounting portion relative to said bridging flange;

a pair of arms each having a first end portion arranged for engagement with said upwardly facing surface, a second end portion arranged for engagement with said downwardly facing surface and a connecting portion formed integrally with and arranged to extend vertically between said end portions forwardly of said edge surface, said through openings of said guide flanges of each said pair of guide flanges slidably receiving one of said arms for movement lengthwise of said connecting portion thereof; and a pair of clamping means supported one by each of said second pair of flanges for releasable clamping engagement with said connecting portions of said arms.

3. The adjustable support according to claim 2, wherein said guide flanges of each pair of guide flanges are vertically inclined relative to one another and said through openings are elongated with a minimum dimension sized to slidably engage said connecting portion and a maximum dimension sized to permit one of said first end portion and said second end portion to be removably inserted therethrough for positioning said connecting portion within said through openings, and said maximum dimension extending in the direction in which said guide flanges of each pair of guide flanges are inclined relative to one another.

4. The adjustable support according to claim 3, wherein said pair of clamping means includes a pair of clamping screws arranged to engage said connecting portions intermediate said guide flanges of each pair of guide flanges.

* * * * *

UNITED STATES PATENT AND TRADEMARK OFFICE
CERTIFICATE OF CORRECTION

PATENT NO. : 5,722,624
DATED : March 3, 1998
INVENTOR(S) : Richard L. Watt; Keith R. Ptak It is certified that error appears in the above-indentified patent and that said Letters Patent is hereby corrected as shown below:

Column 4, line 62: Change "flange" to "flanges"
Column 5, line 16: Insert "," after "flanges"

Signed and Sealed this

Fourth Day of August, 1998

Attest:

BRUCE LEHMAN

Attesting Officer

Commissioner of Patents and Trademarks